United States Patent Office 2,995,924
Patented Aug. 15, 1961

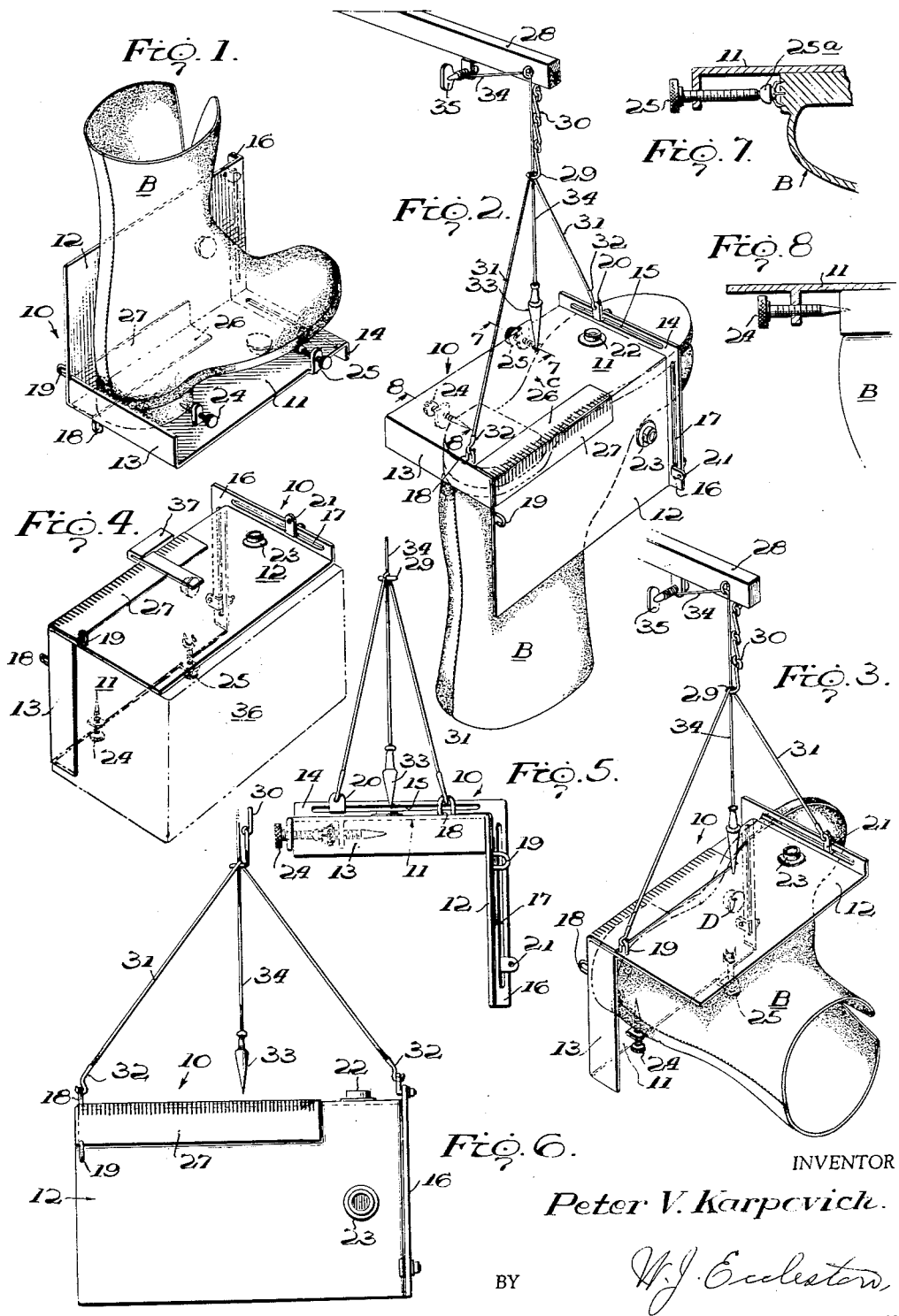

2,995,924
DEVICE FOR LOCATING THE CENTER OF GRAVITY OF FOOTGEAR
Peter V. Karpovich, Springfield, Mass., assignor to the United States of America as represented by the Secretary of the Army
Filed June 16, 1958, Ser. No. 742,450
8 Claims. (Cl. 73—65)

This invention relates to a device for locating the center of gravity of footgear for use primarily, although not exclusively, by members of the Armed Services.

It is the aim of the modern designers of military footgear to provide maximum protection for the feet and to raise the efficiency of locomotion without causing discomfort so, from time to time, shoe designers recommend changes in the construction of military footgear in order to make them more comfortable and efficient. Before the adoption of any such newly-designed footgear, it is desirable and expedient to test its effectiveness. Known methods of testing are to obtain subjective reports of the wearers of the footgear and by field testing them. In lieu of these old methods, it was decided to explore the possibility of developing more objective methods of testing footgear which, among others, was to determine the effect of various types of military footgear upon the energy cost of walking. In making this determination, it became necessary to equalize the weight of lighter boots with that of the heavier ones by attaching additional weights to the boots. It was obvious that additional weight should be placed in such a manner that the location of the center of gravity in the lighter boot with the added weight would be the same as in the heavier one. Therefore, it became necessary to determine the location of the center of gravity of various types and sizes of footgear.

It is therefore the principal object of the present invention to provide a new and novel device for easily and quickly determining the position of a point in space, namely, the center of gravity of footgear, such as boots and shoes for military personnel; another object being to provide a relatively simple and inexpensive, yet efficient and accurate device for the specified purpose.

The foregoing and other objects and advantages of the present invention will appear from the following description and appended claims when considered in conjunction with the accompanying drawing forming a part of this specification, wherein like reference characters designate corresponding parts in the several views.

In said drawing:

FIG. 1 is a perspective view of the device of the invention, showing a shoe or boot in position thereon;

FIG. 2 is a perspective view showing the device and boot of FIG. 1 in inverted position and being suspendingly supported for locating projection of the center of gravity of the boot on one plane;

FIG. 3 is a perspective view showing the device and boot of FIG. 3 suspendingly supported after being turned 90° for the purpose of locating projection of the center of gravity of the boot on another plane disposed at right angles to the plane of FIG. 2;

FIG. 4 is a perspective view of the device without the suspending means and boot of FIGS. 2 and 3, with the device having been placed upon a special supporting rack, permitting the measurement of the distance of the center of gravity from one of the above-mentioned planes;

FIG. 5 is an end elevation of the inverted and suspended device as in FIG. 2 but without the boot;

FIG. 6 is a side elevation of the device and boot shown in FIG. 2;

FIG. 7 is a fragmentary vertical transverse section, somewhat enlarged, taken substantially along the line 7—7 of FIG. 2, looking in the direction of the arrows; and FIG. 8 is a fragmentary detail vertical transverse sectional view, taken substantially along the line 8—8 of FIG. 2, looking in the direction of the arrows.

Generally speaking, the device of the present invention comprises a body formed from metal, such as sheet aluminum, shaped into three mutually perpendicular planes which constitute the three coordinate planes necessary for the determination of the position of a point in space, said point in the present instance, being the center of gravity of a boot or shoe. One such plane is the base portion of the body, another plane being an upstanding right-angularly disposed side wall, and a third, an upstanding low wall or flange at one end of the base. A spirit level is attached to the outer surface of the base and a similar level is attached to the outer surface of the upstanding side wall. In addition, both outer surfaces carry scales which are graduated in centimeters. The device has a pair of right-angularly disposed transversely slidable suspending means or connectors which are adapted to slide in the base and side wall, respectively, a fixed eye adjacent the end of the base opposite the base-mounted slidable connector, and a fixed eye adjacent the end of the side wall opposite the slidable connector carried thereby. Suitable suspension means, such as a string, or cord, for attachment to a fixed eye and slidable connector is provided for suspendingly supporting the device, as is a plumb bob for indicating the center of gravity of footgear when the device is in use.

In the drawing, the device is shown as a whole at 10 and comprises a base portion or plate 11, an integral side wall 12 extending perpendicularly from the base at a long side edge thereof, and an end wall 13 extending perpendicularly from a short side edge or end of said base. The underside of the base 11 has at its end opposite to the wall 13 a flange 14 having a longitudinal slot 15 formed therein. Side wall 12 has on its outer surface a similar flange 16 having a longitudinal slot 17 formed therein. Base 11 has on its outer face, an eye or loop 18, there being a similar eye or loop 19 on the outer face of side wall 12. An adjustable connector member 20 is slidably mounted in slot 15. A similar adjustable connector 21 is slidably mounted in slot 17, see FIG. 2.

The underside of base plate 11 carries a conventional spirit level 22 located adjacent flange 14 and the outer surface of side wall 12 carries a similar spirit level 23, located adjacent flange 16.

The inner surface of base 11 carries an adjustable thumbscrew 24 whose pointed end engages the heel of a boot B. A thumbscrew 25, having a 4-pronged swivel inner end 25a is also carried by the base 11, with the prongs thereof engaging the sole of said boot B, see particularly FIGS. 1, 7 and 8. When so engaged, the medial side of right boot B is clamped against the side wall or plane 12 by the screws 24 and 25, with the back end of the heel in engagement with the end flange or plane 13, see FIGS. 1, 2 and 3.

The underface of base plate 11 carries a scale 26 and side wall 12 carries a similar scale 27, both scales being graduated in millimeters.

FIG. 2 shows the device 10 and supported boot B suspendingly supported in one position for determination of the center of gravity, from a support 28, by means of a ring 29 on the lower end of a depending chain 30 and a string 31 which passes through ring 29 and carries hooks 32, 32 at its opposite ends which are engaged with eye 18 and adjustable connector 20 carried by base 11. By alternately adjusting the position of the string 31 on the ring 29 and the position of hook 32 and connector 20 in the slot 15, the device may be brought into a horizontal position which will be indicated by the level 22.

A plumb bob 33 carried by a string 34 is employed to indicate the center of gravity of the device and shoe or boot B. When in a level, steady and horizontal position, thumbscrew 35 on support 28 is turned to let down string 34 until the tip of plumb bob 33 touches plate 11. Since the tip has been previously dipped into, or touched with, a drop of preferably yellow casein paint, it will leave a yellow mark on said plate 11.

Because of the fact that the plumb bob 33, when it passes through ring 29 is directly under the point of suspension of the device, the yellow mark C, FIG. 2, represents the vertical projection of the center of gravity on plate or plane 11 and therefore indicates the distance of the center of gravity from side wall of plane 12 and end wall or plane 13.

To find the distance of the center of gravity from base plate or plane 11, string 31 and hooks 32, 32 are removed from eye 18 and connector 20 and attached to eye 19 and connector 21 carried by side wall or plane 12, see FIG. 3. The procedure of leveling and marking with the plumb bob 33 is repeated. The yellow mark D, in this case, indicates the distance of the center of gravity from side wall or plane 12 and end wall or plane 13.

To measure the distance of the center of gravity from the coordinate planes, boot B is removed from the device 10 by releasing clamps 24 and 25 and the device placed upon a special rack or block 36, see FIG. 4. By placing a small square 37 as indicated in FIG. 4, the distance of the center of gravity from the base or plane 11 and the end wall or plane 13 can be measured simultaneously. The distance from the base or plane 11 is to be read from the scale on square 37 in such a manner that it measures distance from the inner surface of the side wall or plane 12. The distance from the inner surface or face of the end wall 13 is, of course, read directly from the scale 27.

The distance of the center of gravity from side wall or plane 12 is measured by placing the device so that base plate or plane 11 is horizontal, and using square 37 in the same manner, as in finding the distance from base or plane 11.

Obtained measurements are recorded as follows: 3.5, 4.3, 6.2, indicating the distance, in centimeters, from planes 11, 12, and 13, respectively.

Since device 10 weighs 9.5 ounces, the measurements thus obtained do not represent the true measurements for the boot B alone. For this reason, correction should be made based on the position of the center of gravity of the device itself. The distance of the center of gravity from the coordinate planes is: 11—2.8; 12—4.2; and 13—12.8. This correction is made in the following way.

Knowing the location of the center of gravity for the device 10 and the boot B together, and for the center of gravity of the device 10 alone, the center of gravity of boot B alone can be located.

Let $W_1$ = weight of device 10
$W_2$ = weight of device 10 and boot B together
$W_3$ = weight of the boot B alone And $X_1$, $X_2$, $X_3$ represent distances of the center of gravity from one of the coordinate planes:

$X_1$ = for the device 10
$X_2$ = for the device 10 and boot B together
$X_3$ = for the boot B alone The moment of force $W_2$ is equal to the sum of moments $W_1$ and $W_3$.

$$X_2 W_2 = X_1 W_1 + X_3 W_3$$
$$X_3 W_3 = X_2 W_2 - X_1 W_1$$
$$X_3 = \frac{X_2 W_2 - X_1 W_1}{W_3}$$

The following is the principle on which device 10 was built: As is known from physics, a plumb line passing through the point of suspension of an object passes also through the center of gravity of the object. Therefore, by suspending an object in two different positions, as indicated in the accompanying drawing, the center of gravity will lie at the intersection of the two plumb lines.

When device 10 is used, one of the sides 11 or 12 is placed in a horizontal position and the side, or plane 13 always remains vertical. This means that both plumb lines are parallel to side or plane 13, and therefore the distance of the center of gravity from plane 13 can be found by measuring the distance of the yellow mark from plane 13.

When base or plane 11 is in a horizontal position, the plumb line, while being parallel to plane 13, is also parallel to plane 12. Therefore, the distance of the yellow mark on base or plane 11 from the plane 12 measures the distance of the center of gravity from plane 12. In the same manner, the distance of the yellow mark on the side wall or plane 12 from plane 11 is the measure of the distance of the center of gravity from plane 11.

While a detailed description of one form of the present invention has been given, obviously, the invention is not limited to the details shown and described, but may assume other forms.

I claim:

1. A device for locating the center of gravity of footgear, comprising a body having a base portion, a side wall extending perpendicularly from the base at a long side thereof, and an end wall extending perpendicularly from a short side of the base, said base, side and end walls together providing means for supporting a boot, clamping means carried by the base for engagement with the heel and sole portions of the boot for maintaining the boot in position with relation to the body, separate means adjustable transversely of the base and side wall adjacent an end thereof, and fixed eyes carried by the base and side wall in association with the separate adjustable means for the attachment thereto of suspending means for the device.

2. A device according to claim 1, wherein spirit levels are attached to both the base portion and the side wall and cooperate with the separate adjustable means to indicate the horizontal positioning of the base portion or side wall, and wherein graduated scales are also attached to the base portion and side wall to indicate on said base portion or said side wall the distance of the center of gravity of the footgear from said end wall.

3. A device for suspendingly supporting an article of footgear for locating the center of gravity thereof, in combination, a metallic body forming a base portion, a side wall extending perpendicularly from the base at a long side thereof, and a relatively low end wall extending perpendicularly from a short side of the base portion, said base portion, side and end walls together providing means for supporting a boot, clamping means on the base portion for engagement with the boot to maintain the same in position, separate fixed and adjustable connector means carried by said base portion and said side wall for the attachment of means for suspendingly supporting the device, graduated scales on the base portion and side wall disposed in edgewise relationship, means for suspendingly supporting said device, and means in association with the supporting means for registering the precise center of gravity of said boot.

4. A device according to claim 3, wherein level indicators are carried by the base portion and side wall of the device.

5. A device for locating the center of gravity of footgear, means for suspendingly supporting the device, said device comprising means including a base having a right-angularly disposed side wall and a partial end wall for suspendingly supporting a boot in successive planes disposed at right angles to each other, means for successively marking a point to denote the center of gravity of both planes, separate leveling means for the base and side wall, means for measuring simultaneously the distance of the center of gravity from the base and end wall, and means for measuring the distance of the center of gravity from said side wall.

6. A device for locating the center of gravity of footgear, said device comprising means including a base having a right-angularly disposed side wall and a partial end wall for suspendingly supporting a boot in successive planes disposed at right angles to each other, means for successively marking a point to denote the center of gravity of both planes, separate leveling means for the base and side wall, means for measuring simultaneously the distance of the center of gravity from the base and end wall, means for measuring the distance of the center of gravity from said side wall, and releasable means for suspendingly supporting said first-named means and said boot.

7. A device for locating the center of gravity of footgear, said device comprising means including a base having a right-angularly disposed side wall and a partial end wall for suspendingly supporting a boot in successive planes disposed at right angles to each other, means for successively marking a point to denote the center of gravity of both planes, separate leveling means for the base and side wall, means for measuring simultaneously the distance of the center of gravity from the base and end wall, means for measuring the distance of the center of gravity from said side wall, releasable means for suspendingly supporting said first-named means and said boot, and connecting members associated with the base and side wall and engageable by said releasable suspending means.

8. A device for locating the center of gravity of footgear, said device comprising means including a base having a right-angularly disposed side wall and a partial end wall for suspendingly supporting a boot in successive planes disposed at right angles to each other, means for successively marking a point to denote the center of gravity of both planes, separate leveling means for the base and side wall, means for measuring simultaneously the distance of the center of gravity from the base and end wall, means for measuring the distance of the center of gravity from said side wall, releasable means for suspendingly supporting said first-named means and said boot, and connecting members associated with the base and side wall and engageable by said releasable suspending means, certain of said connecting members being adjustable relative to other connecting members.

References Cited in the file of this patent

UNITED STATES PATENTS 2,722,827     Spencer _____ Nov. 8, 1955